United States Patent Office 2,734,055
Patented Feb. 7, 1956

2,734,055
GLUCOSIDES OF CHLORAMPHENICOL

Gino Carrara and Emilio Testa, Milan, Italy, assignors to Lepetit S. p. A., Milan, Italy No Drawing. Application May 21, 1954,
Serial No. 431,577

Claims priority, application Great Britain May 26, 1953

3 Claims. (Cl. 260—210)

The present invention relates to glucosides of chloramphenicol.

The products with which the invention is concerned can be represented by the following general formula:

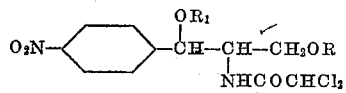

where R is a d-glucose radical, and $R_1$ represents hydrogen or is identical with R.

The pharmacological properties of chloramphenicol, a substance of natural origin having outstanding antibiotic activity, is well known. Several methods of synthesis have been described in technical literature and have been covered by a number of patents. However its use has been restricted to oral or topical use because of its very slight solubility in water. The compounds described in the present application allow the use of chloramphenicol by the parenteral route, since they are sufficiently soluble in water to form solutions which, when injected subcutaneously or intramuscularly, provide a therapeutically useful blood concentration, thus avoiding side reactions which can be associated with the introduction of the drug through the gastroenteric tract.

The glucosides to which the present invention relates can be readily prepared by the following method. The aldohexose is first acylated, yielding a pentaacyl derivative, which reacted with hydrogen bromide, gives a tetraacyl-bromo-aldohexose. This latter compound in the presence of silver carbonate, reacts with chloramphenicol in an appropriate solvent yielding, according to the relative amount of the reactants, either a mono or a diglucoside of chloramphenicol.

The invention can be clearly illustrated by the following examples:

Example I

To a solution of 5 g. chloramphenicol in 100 ml. of anhydrous ethyl acetate, 6.7 g. of α'-tetraacetobromo-d-glucose are added. After addition of 16 g. freshly prepared and dried silver carbonate, the mixture is shaken mechanically for 6 hrs. The precipitate is filtered in vacuo and washed with ethyl alcohol; the filtrate is evaporated to dryness; the residual oil is dissolved in 2.5 ml. of a 5% solution of sodium in methanol; the resulting solution is stirred for 1 hr. at room temperature. The formed precipitate, which consists of sodium acetate, is filtered in vacuo and the filtrate is evaporated to dryness. The residue is rubbed with 50 ml. anhydrous acetone, which causes separation of an additional amount of sodium acetate; after filtering and evaporation of the filtrate to dryness, an oil results, which crystallizes after several days, yielding white crystals. It is soluble in water at a 1:30 ratio and has the following analytical data:

$[\alpha]_D^{20} + 9.7°$ ($c=3$, $H_2O$); Cl% calc. 14.65, found 14.58

The product is the monoglucoside of chloramphenicol having M. P. 74° C.

Example II

This preparation is carried out exactly as described in Example I, but using 13.5 g. of α'-tetraacetobromo-d-glucose and 32 g. silver carbonate. The obtained product is an oil which crystallizes after several days in the form of white crystals. It is soluble at a 1:25 ratio in water and has the following analytical data:

$[\alpha]_D^{20} + 16.4°$ ($c=3$, $H_2O$); Cl% calc. 10.95, found 10.84

The product is the diglucoside of chloramphenicol.

We claim:

1. A compound of formula

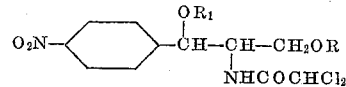

wherein R is a d-glucose radical and $R_1$ is a member of the group consisting of hydrogen and a d-glucose radical.

2. A compound of formula

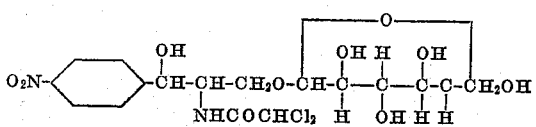

chloramphenicol d-glucose monoglucoside.

3. A compound of formula

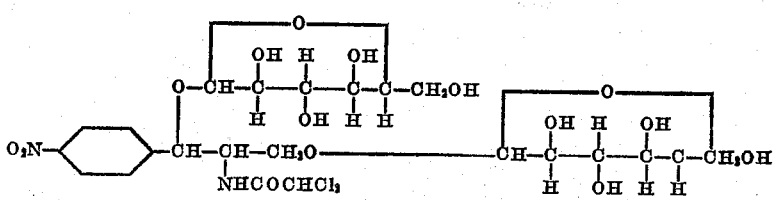

chloramphenicol d-glucose diglucoside.

References Cited in the file of this patent

Richter's "Org. Chem.," vol. I (1944), pp. 693–95.